United States Patent [19]

Takahashi et al.

[11] Patent Number: 5,195,822
[45] Date of Patent: Mar. 23, 1993

[54] PLAIN LIGHT SOURCE DEVICE

[75] Inventors: Nobuyuki Takahashi, Kawachinagano; Hisashi Oyama, Ikoma, both of Japan

[73] Assignee: Sharp Kabushiki Kaisha, Osaka, Japan

[21] Appl. No.: 690,578

[22] Filed: Apr. 24, 1991

[30] Foreign Application Priority Data

Apr. 24, 1990 [JP] Japan .................. 2-109835

[51] Int. Cl.$^5$ .............................................. F21V 7/22
[52] U.S. Cl. ................... 362/296; 362/307; 362/311; 362/341; 359/48; 359/50
[58] Field of Search ............... 362/296, 299, 307, 311, 362/341, 800, 29; 181/211, 289; 359/48, 49, 70, 83, 50; 313/493

[56] References Cited

U.S. PATENT DOCUMENTS

| | | | |
|---|---|---|---|
| 3,869,637 | 3/1975 | Usui | 313/500 |
| 3,884,560 | 5/1975 | Neylan et al. | 362/34 |
| 4,616,295 | 10/1986 | Jewell et al. | 359/48 |
| 4,659,183 | 4/1987 | Suzawa | 359/49 |
| 4,826,294 | 5/1989 | Imoto | 359/49 |
| 4,922,392 | 5/1990 | Egami et al. | 362/217 |
| 4,933,823 | 6/1990 | Taylor | 362/296 |
| 4,958,911 | 9/1990 | Beiswenger et al. | 359/83 |

FOREIGN PATENT DOCUMENTS

| | | | |
|---|---|---|---|
| 0319655 | 6/1989 | European Pat. Off. | 362/225 |
| 3531736 | 3/1986 | Fed. Rep. of Germany . | |
| 60-13516 | 1/1985 | Japan . | |
| 0002126 | 1/1986 | Japan | 359/83 |
| 61-151955 | 7/1986 | Japan . | |
| 63-89821 | 4/1988 | Japan . | |
| 0013923 | 1/1990 | Japan | 359/48 |
| 0109020 | 4/1990 | Japan | 359/50 |
| 0208631 | 8/1990 | Japan | 359/50 |
| 0235022 | 9/1990 | Japan | 359/48 |
| 0297522 | 12/1990 | Japan | 359/48 |
| 0298920 | 12/1990 | Japan | 359/48 |

Primary Examiner—Ira S. Lazarus
Assistant Examiner—Y. Quach

[57] ABSTRACT

In a plain light source device used for backlighting a light transmission type liquid crystal display, a reflector for reflecting the light from the light source toward the liquid crystal panel is provided which is formed from a conductive resin (plastic) consisting of a resinous (plastic) material with a metal fiber mixed therein. The thus formed reflector is an insulator at its surfaces and a conductor inside. A board on which the light source is supported is electrically and mechanically connected to the reflector for grounding. The reflector thereby serves as a shield against the noise generated by the light source. Further, a transparent conductive sheet is disposed on the front side (on the display panel side) of the light source. The conductive sheet is electrically connected to the board for grounding. As a result, the light source is surrounded by the reflector and the transparent conductive sheet, both grounded, thus providing further reliable shielding.

8 Claims, 3 Drawing Sheets

PLAIN LIGHT SOURCE DEVICE

BACKGROUND OF THE INVENTION

1. Field of the Invention

The present invention relates to a plain light source device, and more particularly to a plain light source device having a commonly used fluorescent tube as a light source for a backlighting of a light transmission type liquid crystal display device.

2. Description of the Prior Art

When a fluorescent tube is used as a light source in a plain light source device for a backlighting of a light transmission type liquid crystal display device, there arises the problem that the fluorescent tube generates noise because of the application of a high voltage, which adversely affects the liquid crystal display device.

To avoid this problem, there have heretofore been taken such measures as providing a reflector formed from a metal or a metal evaporated resin (plastic) as shown in FIG. 1. In FIG. 1, the numeral 1 indicates a resinous (plastic) reflector, and 2 a metal evaporated layer.

Also, to prevent the noise interference to the display panel (liquid crystal panel), there have been taken such measures as disposing a mesh-like metal plate 3 shown in FIG. 2 above the fluorescent tube or providing a transparent conductive sheet on the rear side of the panel.

Generally, light transmission type liquid crystal display devices require a high-luminous uniform backlight, that is, a plain light source device.

However, when the reflector formed from a metal or a metal evaporated plastic, as shown in FIG. 1, is used, the luminance distribution on the display screen greatly varies depending on the shape of the reflector. This makes it extremely difficult to design a proper reflector, and a separate device such as a light curtain to be disposed above the fluorescent tube is required for uniform luminance distribution.

Also, when the mesh-like metal plate 3 is provided above the fluorescent tube, as shown in FIG. 2, to prevent the noise interference to the liquid crystal panel, the light emitted from the fluorescent tube is blocked by the metal plate 3. This reduces the efficiency of light utilization and therefore requires an increase in the output of the fluorescent tube to obtain high luminance, which results in a decrease in the efficiency of the lighting circuit.

Furthermore, when the transparent conductive sheet is mounted on the rear side of the display panel, a complicated grounding method is required.

SUMMARY OF THE INVENTION

In view of the above-enumerated problems, it is an object of the invention to provide a plain light source device which eliminates the need for external provision of noise preventive measures and which facilitates the designing of apparatus.

According to the invention, there is provided a plain light source device comprising a light source disposed on the rear side of a display panel and a reflector for reflecting the light from the light source toward the display panel, wherein the reflector being formed from a resin (plastic) having conduction to prevent the noise generated by the light source from causing external interference.

The plain light source device of the invention further comprises a board for holding the light source and is characterized in that the reflector is electrically connected to the board for grounding.

The plain light source device of the invention is also characterized in that the reflector is formed in such a shape to enclose the light source and have an open top facing the display panel.

The plain light source device of the invention is further characterized in that the reflector has a while reflecting surface.

Also, the plain light source device of the invention comprises a transparent conductive sheet disposed on the display panel side of the light source.

Furthermore, the plain source device of the invention is characterized in that the transparent conductive sheet is electrically connected to the board for grounding.

Moreover, the plain light source device of the invention is characterized in that the transparent conductive sheet is formed from a transparent film with a thin metal film of ITO evaporated on the surface thereof.

According to the invention, the reflector, which is formed from a resin having conduction, serves as a shield against the noise generated by the light source.

Also, since the reflector is a resinous molding, when the reflector has a white reflecting surface, the luminance distribution on the display screen is prevented from greatly varying depending on the shape of the reflector, which makes it possible to readily obtain uniformity in the luminance.

Also, according to the invention, with the conductive sheet disposed on the display panel side of the light source, connection to the ground is facilitated, and also the light source is surrounded by the reflector and the transparent conductive sheet, thus achieving effective utilization of the light while providing further reliable shielding.

As is apparent from the above description, according to the invention, the reflector is formed from a resin having conduction and therefore serves as a shield against the noise generated by the light source. Also, since the reflector is a resinous molding, when the reflector has a white reflecting surface, the luminance distribution on the display screen is prevented from greatly varying depending on the shape of the reflector, which makes it possible to readily obtain uniformity in the luminance.

Also according to the invention, since the conductive sheet is disposed on the display panel side of the conductive sheet, connection to the ground is facilitated, and also the light source is surrounded by the reflector and the transport conductive sheet, thus achieving effective utilization of the light while providing further reliable shielding.

Accordingly, the invention has such excellent advantages as facilitating the designing of the reflector while providing shielding of the light source.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings which are given by way of illustration only, and thus are not limitative of the present invention, wherein.

DETAILED DESCRIPTION OF THE PREFERRED EMBODIMENTS

Figure 1:
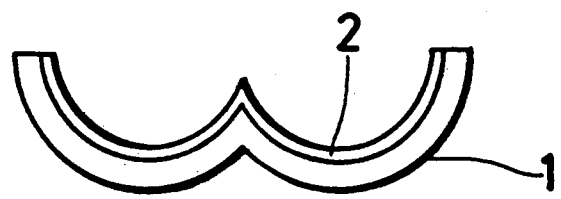
FIG. 1 is a side view of a prior art reflector 1 for plain light source device.
Figure 2:
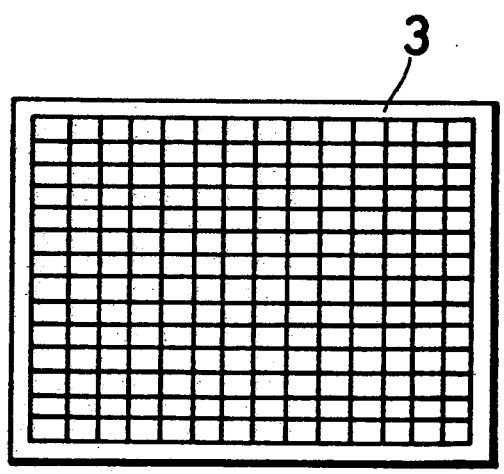
FIG. 2 is a plan view of a metal plate 3 mounted above a light source to prevent noise interference to the display panel in the prior art plain light source device.

Now referring to the drawings preferred embodiments of the invention are described below.

First Embodiment

A first embodiment is described below with reference to FIGS. 3 and 4.

Figure 3:
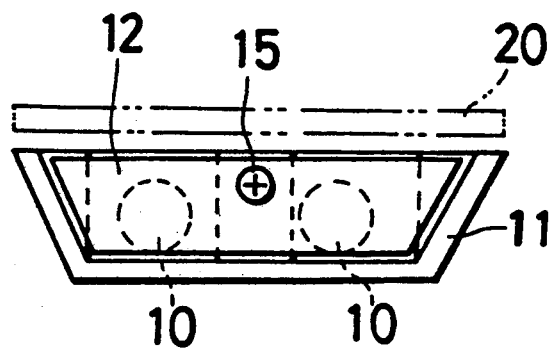
FIG. 3 is a side view of a plain light source device in a first embodiment of the invention.

FIG. 3 is a side view of a plain light source device according to the first embodiment of the invention. FIG. 4 is a plan view of the plain light sourced device.

As shown, the plain light source device of this embodiment, which is used for backlighting of a light transmission type liquid crystal display device, comprises a light source 10 disposed on the rear side of a display panel (liquid crystal panel) 20 and a reflector 11 for reflecting the light from the light source 10 toward the display panel 20.

Figure 4:
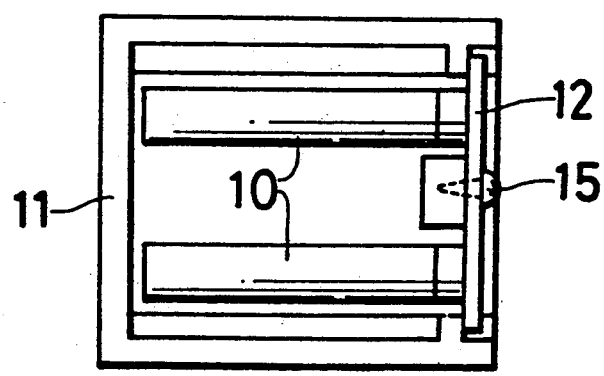
FIG. 4 is a plan view of the plain light source device of FIG. 3.

The light source 10 consists of two fluorescent tubes (or U-shaped fluorescent tube) disposed parallel with each other inside the reflector 11, as shown in FIGS. 3 and 4. The light source 10 is supported on a light source supporting board 12.

Figure 5:
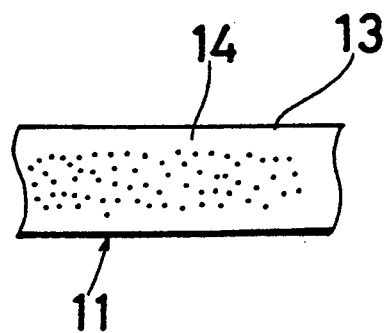
FIG. 5 is a cross sectional view of an essential portion of a reflector 11.

The reflector 11 is formed in a box-like shape from a conductive resin, which consists of a resinous (plastic) material 13 with a metal fiber 14 mixed therein as shown in FIG. 5, so that the reflector 11 has a shielding effect to prevent the noise generated by the light source 10 from causing external interference. The molding conditions are controlled so that the reflector 11 is an insulator at its surfaces and a conductor inside. Also, the reflector 11 is both electrically and physically (mechanically) connected to the light source supporting board 12 by means of a metal screw 15. The reflector 11 does not necessarily have to be formed in a box-like shape, but may be formed in other shapes as long as it surrounds the light source 10 and has an open top facing the display panel 20.

In the above construction, a conductive resin is used to form the reflector 11, to which the board 12 holding the light source 10 (fluorescent tubes) is screwed to provide grounding. The reflector 11 thus serves as a shield against the noise generated by the light source 10.

Also, since the reflector 11 is a resinous molding, when the reflector 11 has a white reflecting surface, the luminance distribution on the display screen is prevented from varying greatly depending on the shape of the reflector 11, which makes it possible to readily obtain uniformity in the luminance.

As a result, the designing of the reflector 11 is facilitated and shielding of the light source 10 can be provided.

Second Embodiment

Next, a second embodiment is described with reference to FIGS. 6 and 7.

Figure 6:
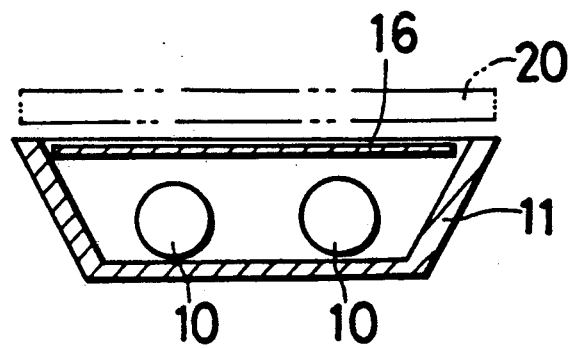
FIG. 6 is a cross sectional view of a plain light source device in a second embodiment of the invention.
Figure 7:
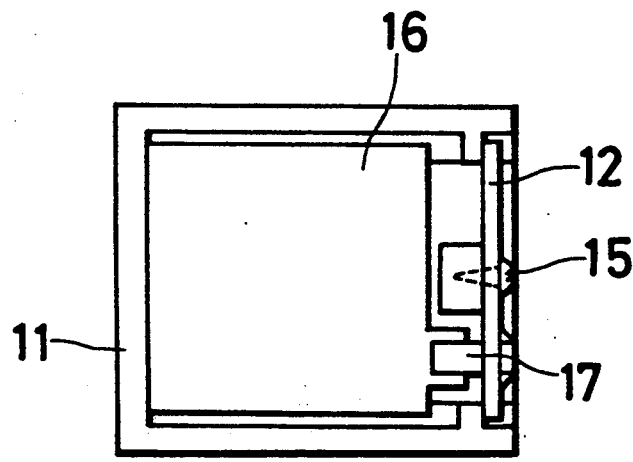
FIG. 7 is a plan view of the plain light source device of FIG. 6.

FIG. 6 is a cross sectional view of a plain light source device in the second embodiment of the invention. FIG. 7 is a plan view of the same. In FIG. 7, the light source 10 is not shown for the sake of simplicity.

As shown, the plain light source device of this embodiment includes a conductive sheet 16 disposed on the display panel 20 side of the light source 10 in order to achieve further effective shielding.

Figure 8:
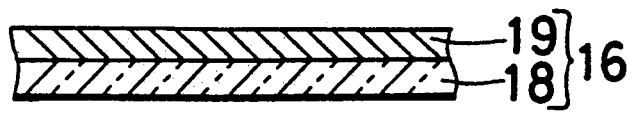
FIG. 8 is a cross sectional view of a transparent conductive sheet 16.

As shown in FIG. 8, the conductive sheet 16 is formed from a transparent film 18 with a thin metal film (ITO; Indium Tin Oxide) 19 evaporated thereon. As shown in FIG. 7, a conductive metal tape 17 is attached to the conductive sheet 16, the conductive metal tape 17 being soldered to the light source supporting board 12 for electrical connection. Otherwise, the construction of this embodiment is the same as that of the first embodiment.

In the above construction, the transparent conductive sheet 16 is disposed above (on the display panel 20 side of) the light source (fluorescent tubes) 10, with the conductive metal tape 17 attached thereto and soldered to the light source supporting board 12 for grounding.

As described, since the conductive sheet 16 is disposed above the light source 10, connecting to the ground is facilitated, and also the light source 10 is surrounded by the reflector 11 and the transparent conductive sheet 16, thus achieving effective utilization of the light while providing further reliable shielding.

It will be appreciated that the invention is not limited to the above embodiments and that other modifications and changes can be made to the above embodiments within the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A plain light source device comprising a light source disposed on a rear side of a display panel and a reflector for reflecting the light from the light source toward the display panel, the reflector being formed from a conductive resin to prevent noise generated by the light source from causing external interference, the conductive resin having a metal fiber mixed therein, a board for holding the light source, wherein the reflector is electrically connected to the board for grounding.

2. The plain light source device as set forth in claim 1, wherein the reflector surrounds the light source except for an open top which faces the display panel.

3. The plain light source device as set forth in claim 2, wherein the reflector has a white reflecting surface.

4. The plain light source device as set forth in claim 2, wherein a transparent conductive sheet is disposed on the rear side of the display panel facing side of the light source.

5. The plain light source device as set forth in claim 3, wherein the transparent conductive sheet is electrically connected to the board for grounding.

6. The plain light source device as set forth in claim 3, wherein the transparent conductive sheet is formed from a transparent film with a thin metal of ITO evaporated on a surface of the transparent film.

7. The plain light source device as set forth in claim 1, wherein the conductive resin is made from a resin and the metal fiber, and the resin and the metal fiber are combined to form a single, one-piece reflector such that an additional shielding member overlying the reflector is avoided.

8. A plain light source device comprising: a light source disposed on a rear side of a display panel and a reflector for reflecting light from a light source toward a display panel, wherein, the reflector is made of a conductive resin to prevent noise generated by the light source from causing external interference, the conductive resin having a metal fiber mixed therein, two side-by-side tubes being provided as the light source, a board being provided on one side of the reflector for holding the two side-by-side tubes and the reflector being electrically connected to the board by a single screw, the reflector and board enclosing the two side-by-side tubes while tops of the two side-by-side tubes are exposed to the display panel.

* * * * *